United States Patent Office 3,349,439
Patented Oct. 31, 1967

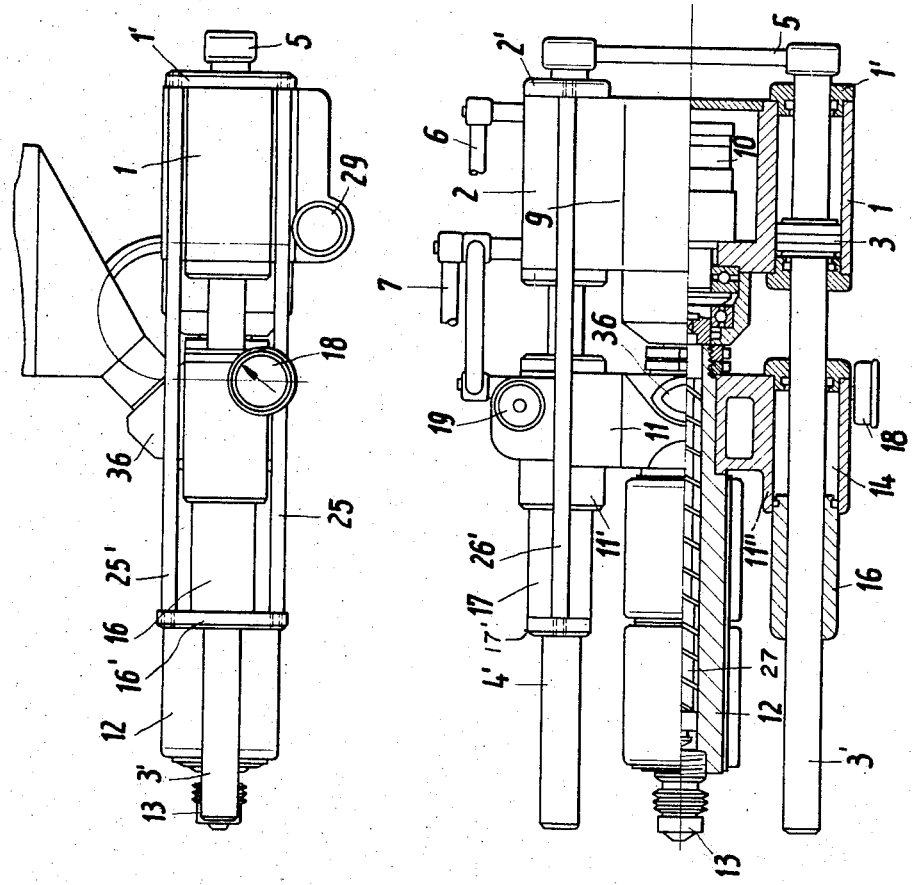

3,349,439
INJECTION MOLDING UNIT
Karl Hehl, Lossburg, Wurttemberg, Germany, assignor to Arburg Maschinenfabrik Hehl & Sohne, Lossburg, Wurttemberg, Germany
Filed Oct. 5, 1965, Ser. No. 493,207
Claims priority, application Germany, Oct. 22, 1964, A 47,395
10 Claims. (Cl. 18—30)

The present invention relates to an injection unit, and particularly to a unit for injecting plastic material into a mold.

This invention is particularly concerned with injection devices of the type having a rotatable conveyor screw disposed in an injection cylinder, the screw and cylinder being mounted on axially movable carriages so as to be able to move axially with respect to one another.

It is a primary object of the present invention to simplify the structure of such devices.

It is another object of this invention to decrease the overall axial dimension of such devices.

According to the present invention, these and other objects are achieved by the provision of an injection unit having an injection cylinder which defines a plastic storage chamber adjacent one end thereof, and plunger means slidably disposed in the cylinder for forcing plastic contained in the storage chamber out of the cylinder and into a mold. The cylinder and plunger are mounted on a pair of parallel support bars and are connected to suitable hydraulic means which act to move the cylinder and the plunger axially with respect to one another. According to one novel feature of the present invention, the hydraulic means are composed of at least one hydraulic cylinder and piston assembly formed by a cylinder defining at least one fluid chamber and surrounding a piston, both the cylinder and the piston being disposed concentrically about one of the support bars.

According to one form of construction of the device of the present invention, two primary cylinder and piston assemblies, each of which is similar to the one described above, are disposed symmetrically about the axis of the injection cylinder with each of the primary assemblies having its associated piston rigidly attached to a respective one of the support bars.

According to another feature of the present invention, two additional cylinder and piston assemblies, each of which assemblies is similar to the one described above, are also disposed symmetrically about the axis of the injection cylinder, with each of the two additional assemblies having its associated piston slidably mounted on a respective one of the support bars and rigidly connected to the cylinder of that one of the primary assemblies which is disposed about the same support bar.

Additional objects and advantages of the present invention will become apparent upon consideration of the following description when taken in conjunction with the accompanying drawings in which:

FIGURE 1 is a side view of a preferred embodiment of the present invention.

FIGURE 2 is a partially cross-sectional top view of the device of FIGURE 1.

Figure 3:
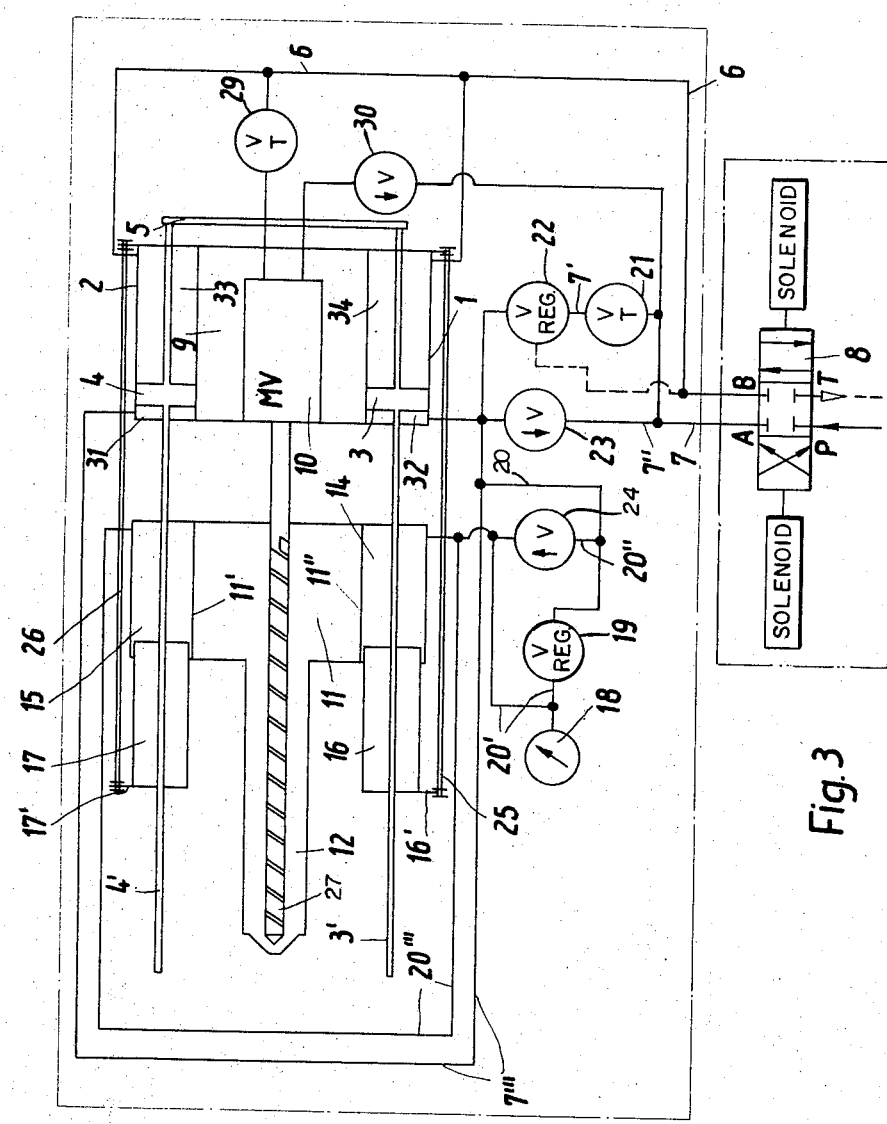
FIGURE 3 is a schematic top view showing a control arrangement for the device of the present invention.

Inasmuch as all of the figures refer to a single embodiment, they will be described in detail as a group.

The injection unit shown consists of an injection cylinder 12 provided at one end with an injection nozzle 13 and surrounded by heating jackets. Nozzle 13 is preferably of the type which is constructed to cause its passage to open automatically when the free nozzle end is forced against the rim of an inlet opening. An axially slidable conveyor screw 27 constituting the plunger means is disposed within cylinder 12 and is connected to a hydraulically-actuated rotary drive 10, with which it forms a structural unit. Drive 10 may be constituted by any suitable, well-known fluid motor. Injection cylinder 12 is mounted in a carriage 11, while the unit constituted by conveyor screw 27 and rotary drive 10 is mounted in a second carriage 9. The carriages 9 and 11 are both slidably mounted on a pair of parallel support bars 3' and 4' so as to be slidable independently of each other in a direction parallel to the longitudinal axis of cylinder 12 and screw 27. Bars 3' and 4' are rigidly connected together by means of a connecting member 5. The driving means for the injection unit is constituted by four hydraulic cylinder and piston assemblies 1–3, 2–4, 11"–16 and 11'–17. A single source of hydraulic fluid (not shown) supplies all four hydraulic assemblies. The properly sequenced actuation of these four hydraulic units controls the movement of the injection unit toward and away from the mold, as well as the relative axial movement between the injection cylinder 12 and the conveyor screw 27.

A first pair of identical hydraulic assemblies 1–3 and 2–4 for the device are symmetrically disposed to either side of the axis of injection cylinder 12, with the cylinders 1 and 2 thereof being rigidly connected to the carriage 9. The cylinders 1 and 2 are each disposed around respective ones of the pistons 3 and 4, and these pistons are each rigidly connected to a respective one of the support bars 3' and 4'.

A second pair of identical hydraulic units 11'–17 and 11"–16 are also symmetrically disposed to either side of the axis of injection cylinder 12. The pistons 16 and 17 of these units are each mounted slidably on respective ones of the support bars 3' and 4', while the surrounding cylinders 11" and 11' are rigidly connected to carriage 11.

The rear ends of cylinders 1 and 2 are provided with projecting flanges 1' and 2', respectively, while the forward ends of pistons 16 and 17 are provided with similar flanges 16' and 17'. The flanges 1' and 16' are connected together by connecting rods 25 and 25' and the flanges 17' and 2' are connected together by connecting rods 26 and 26'. This rigid connection between the pistons 16 and 17 and the cylinders 1 and 2 ensures that the distance between these elements remains constant regardless of the relative positions of the injection cylinder 12 and the conveyor screw 27.

The cylinders 1 and 2 each define a pair of hydraulic fluid chambers, the chambers 34 and 33 being provided for the entrance of hydraulic fluid into the cylinders for producing the return travel (to the right) of cylinders 1 and 2 and the elements to which they are joined, while the chambers 32 and 31 are provided for the introduction of hydraulic fluid into the cylinders for producing the forward movement (to the left) of cylinders 1 and 2, carriages 9 and 11, cylinder 12 and conveyor screw 27. The pistons 16 and 17 are relatively long, so that their respective cylinders 11" and 11' each define only a single chamber 14 and 15, respectively, for the entrance of hydraulic fluid.

Referring particularly to FIGURE 3, the direction of flow of hydraulic fluid with respect to the various cylinder chambers is controlled by a four-way, electromagnetically controlled slide valve 8 feeding a pair of fluid conduits 6 and 7. The slide valve inlet passage P is fed, via an oil distributor, by an oil feed pump, neither of which elements is shown because they represent well known, commercially available components. The main outlet T from the slide valve 8 is connected to a suitable hydraulic fluid storage tank (not shown). The valve 8 is also provided with a pair of feed openings A and B and is constructed to be switchable from a first position in which inlet P communicates with passage B and passage A communicates with outlet T to a second position in which inlet P communicates with passage A and passage B communicates with outlet T, the position assumed by the valve being determined by the selective actuation of one or the other of the solenoids associated therewith. The conduit 7 is connected between the passage A and both the chamber 32 of cylinder 1 and the fluid outlet passage of rotary drive means 10. Interposed in conduit 7 between passage A and chambers 32 and 31 are a pair of parallel branches 7′ and 7″. The branch 7′ contains a throttle valve 21 for regulating the flow rate of hydraulic fluid into the chamber and a pressure regulating valve 22 for regulating the pressure at which fluid flows into this chamber. Branch 7″ contains a one-way valve 23 through which fluid can flow only out of chamber 32. Conduit 7 is also connected to a branch 7‴ feeding chamber 31 of cylinder 2. Thus, the chambers 32 and 31 both receive hydraulic fluid at the same pressure. The chamber 14 of cylinder 11″ is connected to the branch 7‴ through the intermediary of a pair of parallel branches 20′ and 20″, while chamber 15 of cylinder 11′ is connected thereto through branch 20‴. The branch 20″ contains a one-way valve 24 through which fluid flows only in a direction toward the chambers 14 and 15 at the same pressure as the fluid flowing into chambers 31 and 32. The branch 20′ contains a pressure regulating valve 19 associated with a manometer 18 for controlling the pressure at which fluid flows out of the chambers 14 and 15. This valve 19 thus serves to impede the return travel of pistons 16 and 17 in cylinders 11″ and 11′. This arrangement permits the chambers 31, 32, 14 and 15 to all be fed simultaneously with hydraulic fluid at the same pressure. The passage B of valve 8 is connected to a conduit 6 which communicates with the chambers 34 and 33 of cylinders 1 and 2, respectively, and, through the intermediary of a throttle valve 29, with the fluid inlet passage of rotary drive unit 10. The outlet passage of drive unit 10 is provided with a one-way valve 30 through which fluid is permitted to flow only in a direction away from the unit 10.

The device is supported on a suitable stationary base rigidly connected to support bars 3′ and 4′ and connecting piece 5.

In describing the operation of the device, it will be assumed that the operating cycle begins at the end of an injection operation. Outlet nozzle 13 is closed and the proper one of the solenoids associated with valve 8 is actuated to place the valve in a condition where the inlet P feds the passage B and the passage A communicates with the outlet T. Fluid then flows through conduit 6 and throttle valve 29 to rotary unit 10 in order to cause this unit to begin rotating conveyor screw 27. At the same time, fluid flows in through conduit 6 to the chambers 33 and 34, causing the return travel (to the right) of carriage 9 and pistons 16 and 17 connected thereto. Because the presence of regulating valve 19 impedes the outflow of fluid from chambers 14 and 15, this return movement also causes a return movement of carriage 11 until carriages 9 and 11 reach the end of their return travel paths. Plastic material is fed to conveyor screw 27 through an inlet channel 36 and is conveyed by the rotation of this screw into the storage chamber at the end of cylinder 12. During this travel, the plastic is melted by the heating jackets surrounding cylinder 12. After the available volume of the storage chamber is filled, the rotation of conveyor screw 27 continues to deliver plastic material to the outlet end of cylinder 12, causing this cylinder to move towards the mold (to the left), the conveyor screw 27 remaining axially stationary because it is connected to carriage 9, and pistons 16 and 17 moving somewhat into their cylinders. This relative axial movement of cylinder 12 creates a reaction force which applies a pressure to the plastic material contained in the storage chamber. The amplitude of this pressure is determined by the pressure of the fluid contained in chambers 14 and 15 and can therefore be controlled by a suitable regulation of valve 19. The pressure of the fluid in chambers 14 and 15 being indicated by manometer 18.

After the material in the storage chamber in cylinder 12 has been subjected to the desired pressure for a suitable length of time, the other solenoid of valve 8 is actuated so as to switch the valve into a position where the inlet P feeds passage A and the passage B communicates with outlet T. This causes the rotation of screw 27 to cease since the presence of one-way valve 30 prevents fluid from flowing through conduit 7 into rotary drive means 10. At the same time, fluid flowing through conduit 7 passes through branch 7′ into chambers 32 and 31 of cylinders 1 and 2, respectively. Simultaneously, fluid flows out of chambers 34 and 33 through conduit 6 to outlet passage T. This causes the carriages 9 and 11, together with the conveyor screw 27 and injection cylinder 12 mounted thereon, to move in the forward direction (to the left) toward the mold. The chambers 14 and 15 are fed with fluid at the same pressure as the fluid introduced into chambers 32 and 31 through the intermediary of one-way valve 24 in branch 20″. This travel continues until the nozzle 13 of injection cylinder 12 comes in contact with the inlet of the mold. The passage defined by nozzle 13 is then opened, which opening may be effectuated automatically by the pressure of the nozzle 13 against the mold inlet, causing the pistons 16 and 17 to move forward with respect to their cylinders 11″ and 11′ and also causing the cylinders 1 and 2 to move forward with respect to their pistons 3 and 4 so as to drive screw 27 forward with respect to cylinder 12 so as to drive the plastic material out of the storage volume and into the mold. The presence of cylinders 11′ and 11″, whose pistons are subjected to the same pressure as the cylinders 1 and 2, serves to increase the speed and pressure with which the injection process takes place.

After the injection operation is terminated, the valve 8 is switched back to its first position and the process is repeated.

The control of the cycle of operation of the device may be carried out by suitable electronic means, such as by microswitches suitably positioned in the path of travel of various ones of the axially movable elements.

It may thus be seen that the present invention provides a device which is structurally simpler, and shorter, than those of the prior art. These improvements are achieved, primarily, by forming the cylinders of the various hydraulic units so that they surround the stationary support bars and constitute the bearing elements for the movable carriages carrying the conveyor screw and the injection cylinder. The symmetrical arrangement of the hydraulic units with respect to the axis of the injection cylinder leads to further improvements because it reduces to a minimum any tendency of the axes of the injection cylinder and the conveyor screw to tilt out of alignment with respect to one another.

It will be understood that the above description of the present invention is susceptible to various modifications, changes, and adaptations, and the same are intended to be comprehended within the meaning and range of equivalents of the appended claims.

What is claimed is:

1. An injection unit for injecting plastic material into a mold, comprising, in combination:
    (a) an injection cylinder defining a plastic storage chamber adjacent one end thereof;
    (b) plunger means disposed in said cylinder for forcing plastic contained in said storage chamber out of said cylinder;
    (c) a pair of parallel support bars on which said cylinder and said plunger means are mounted; and
    (d) hydraulic means for moving said cylinder and said plunger means axially with respect to one another, said hydraulic means including at least one hydraulic cylinder and piston assembly composed of a cylinder defining at least one fluid chamber and surrounding a piston, both the cylinder and the piston being disposed concentrically about one of said support bars.

2. An arrangement as defined in claim 1 wherein said at least one cylinder and piston assembly comprises two primary cylinder and piston assemblies disposed symmetrically about the axis of said injection cylinder, with each of said primary assemblies having its associated piston rigidly attached to a respective one of said support bars.

3. An arrangement as defined in claim 2 further comprising a first carriage supported by the cylinders of said two primary assemblies and carrying said plunger means.

4. An arrangement as defined in claim 2 wherein said at least one assembly further comprises two additional assemblies disposed symmetrically about the axis of said injection cylinder, with each of said two additional assemblies having its associated piston slidably mounted on a respective one of said support bars and rigidly connected to the cylinder of that one of said primary assemblies which is disposed about said respective one of said support bars.

5. An arrangement as defined in claim 4 wherein each of said support bars passes completely through the cylinder of that one of said additional assemblies which is disposed thereabout.

6. An arrangement as defined in claim 4 further comprising a second carriage supported by the cylinders of said two additional assemblies and carrying said injection cylinder.

7. An arrangement as defined in claim 4 further comprising hydraulic feed means connected to the cylinders of all of said assemblies for feeding hydraulic fluid under the same pressure to said fluid chamber of each of said cylinders.

8. An arrangement as defined in claim 7 wherein said hydraulic feed means comprises pressure regulating means connected to the cylinders of said additional assemblies for regulating the pressure under which fluid is forced out of said fluid chamber of each of said last-mentioned cylinders.

9. An arrangement as defined in claim 7 wherein said hydraulic feed means comprises a one-way valve connected to the cylinders of said additional assemblies for supplying hydraulic fluid to said fluid chambers thereof.

10. An arrangement as defined in claim 7 wherein said hydraulic feed means comprises: a series arrangement of a throttle valve and a pressure regulating valve connected to the cylinders of said primary assemblies for delivering hydraulic fluid to said fluid chambers thereof; and a one-way valve connected to the last-mentioned cylinders for conducting hydraulic fluid from said fluid chambers thereof.

References Cited

UNITED STATES PATENTS

| | | | |
|---|---|---|---|
| 3,020,591 | 2/1962 | Brehu et al. | 18—30 |
| 3,165,785 | 1/1965 | Hehl | 18—30 |
| 3,209,408 | 10/1965 | Kelly | 18—30 |
| 3,259,943 | 7/1966 | Kovach et al | 18—30 |

WILBUR L. McBAY, *Primary Examiner.*